United States Patent
Duncan

[11] 3,919,975
[45] Nov. 18, 1975

[54] MILKER UNIT

[76] Inventor: Lloyd P. Duncan, Rainbow Drive, Washington, Mo. 63090

[22] Filed: Aug. 5, 1974

[21] Appl. No.: 494,962

[52] U.S. Cl. .............................. 119/14.05; 222/64
[51] Int. Cl.² ........................................... A01J 5/00
[58] Field of Search .......... 119/14.05, 14.06, 14.07; 137/391; 222/64

[56] References Cited
UNITED STATES PATENTS

| | | | |
|---|---|---|---|
| 3,044,443 | 7/1962 | Baum | 119/14.06 |
| 3,409,178 | 11/1968 | Dolter | 222/453 X |
| 3,532,074 | 10/1970 | Svensson et al. | 119/14.05 |

Primary Examiner—Hugh R. Chamblee
Attorney, Agent, or Firm—Mason, Mason & Albright

[57] ABSTRACT

A milker unit has a dual chamber arrangement that receives milk directly from an animal and measures the amount of milk that flows to a bulk or collector tank. The milk is normally collected in a lower chamber of the unit until a predetermined level is reached, whereupon the lower chamber is valved open allowing milk to drain to the collector tank. An electric system valves the lower chamber open and also triggers a counter so that the amount of milk draining to the collector tank is automatically recorded. During the draining period, the milk is temporarily collected in the upper chamber until the lower chamber is valved shut, whereupon milk collected in the upper chamber flows by gravity to the lower chamber. The valves in the two chambers are interconnected by a common valve stem having a duct that can equalize the degree of vacuum in the chambers during the draining period of establish ambient atmosphere pressure in the lower chamber to the end that rapid drainage takes place. Differential vacuums or separate vacuum systems can be employed in the unit chambers and the collector line and tank that communicates with the lower chamber.

8 Claims, 4 Drawing Figures

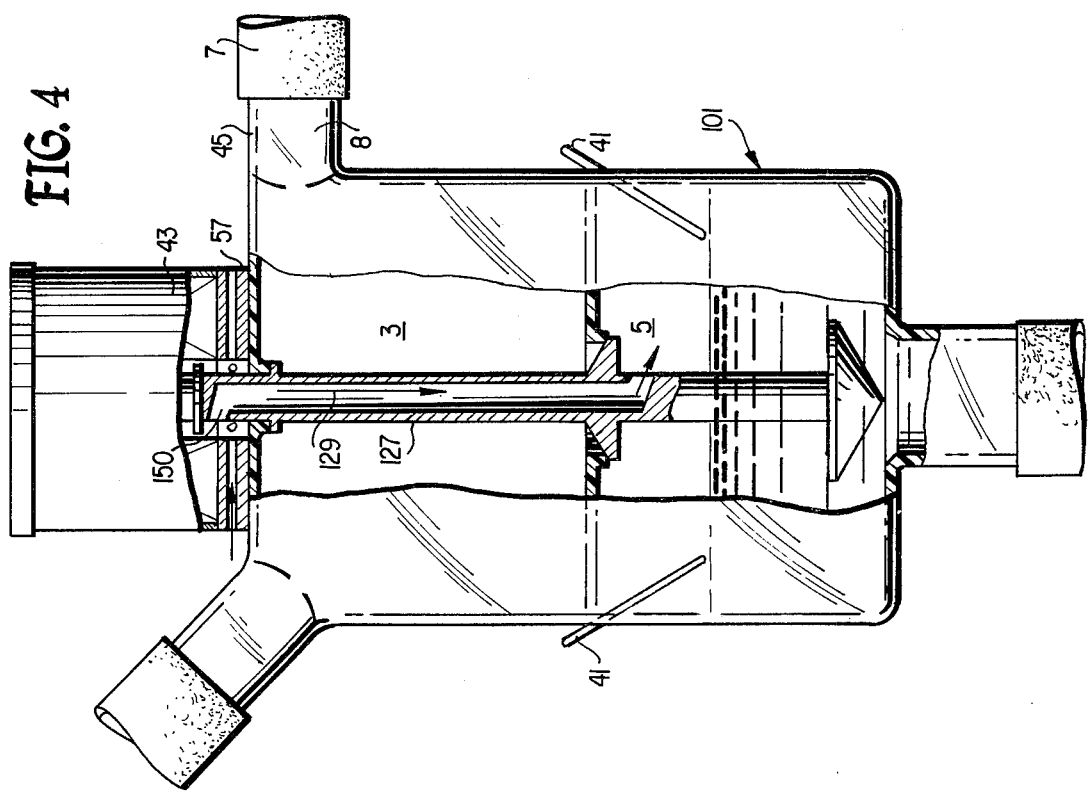
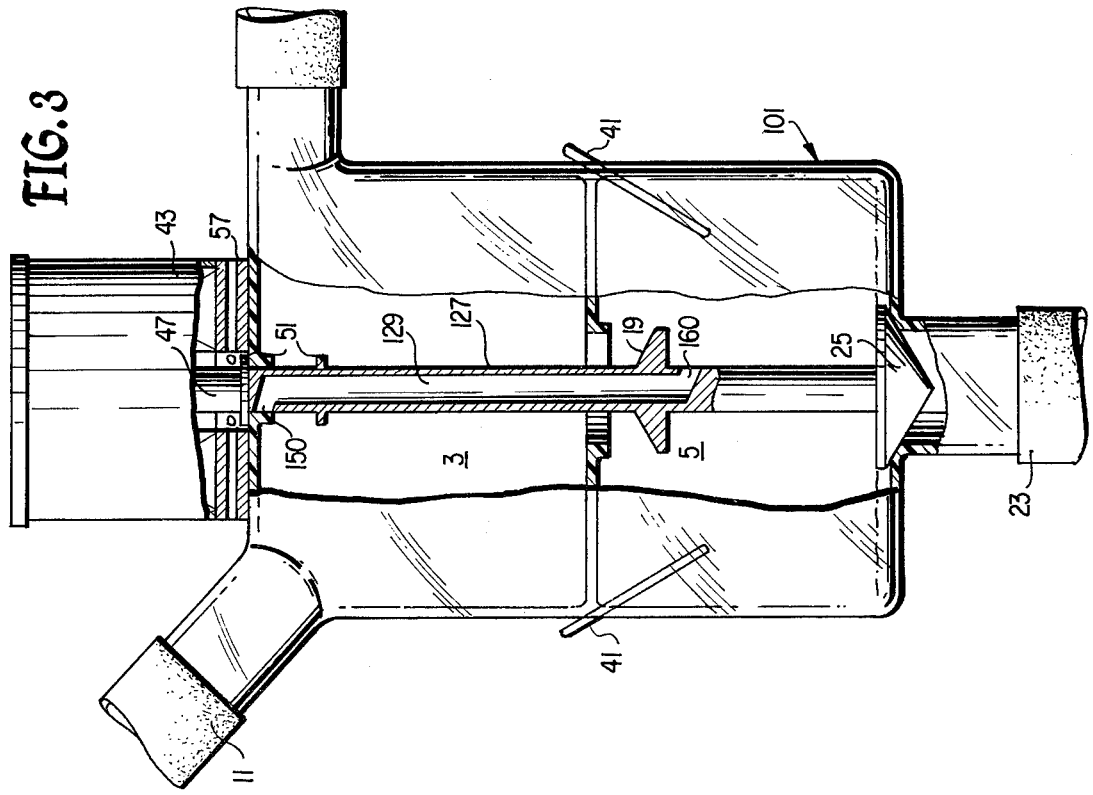

MILKER UNIT

The present invention relates to a milker system, and in particular to a chambered milker unit having a valve and monitoring arrangement for collecting a predetermined increment of milk and counting each increment before the milk is passed to the bulk or collector tank.

Milking systems now being used are often inaccurate in recording and measuring the milk received from individual cows. At the same time, the conventional system is not designed for milking parlor use and most are not automated.

The systems disclosed herein are particularly useful in milking parlors where maximum automation and minimum maintenance are required. Each milker unit is designed with a minimum of exposed parts which can be cleaned in place if cycled with wash and/or rinse water. The increment of milk collected before being drained is individually measured and quickly emptied from the lower chamber owing to a unique valving and venting structure.

It is an object of the present invention to provide a valved unit for automatically measuring and accurately monitoring the milk from individual cows before the milk is collected. These and other objects will be apparent from the below description and appended drawings in which:

FIG. 3 is an elevation in section of a modified valved milk receiver; and

FIG. 4 is similar to FIG. 3 with the valves cycled for draining.

Figure 1:
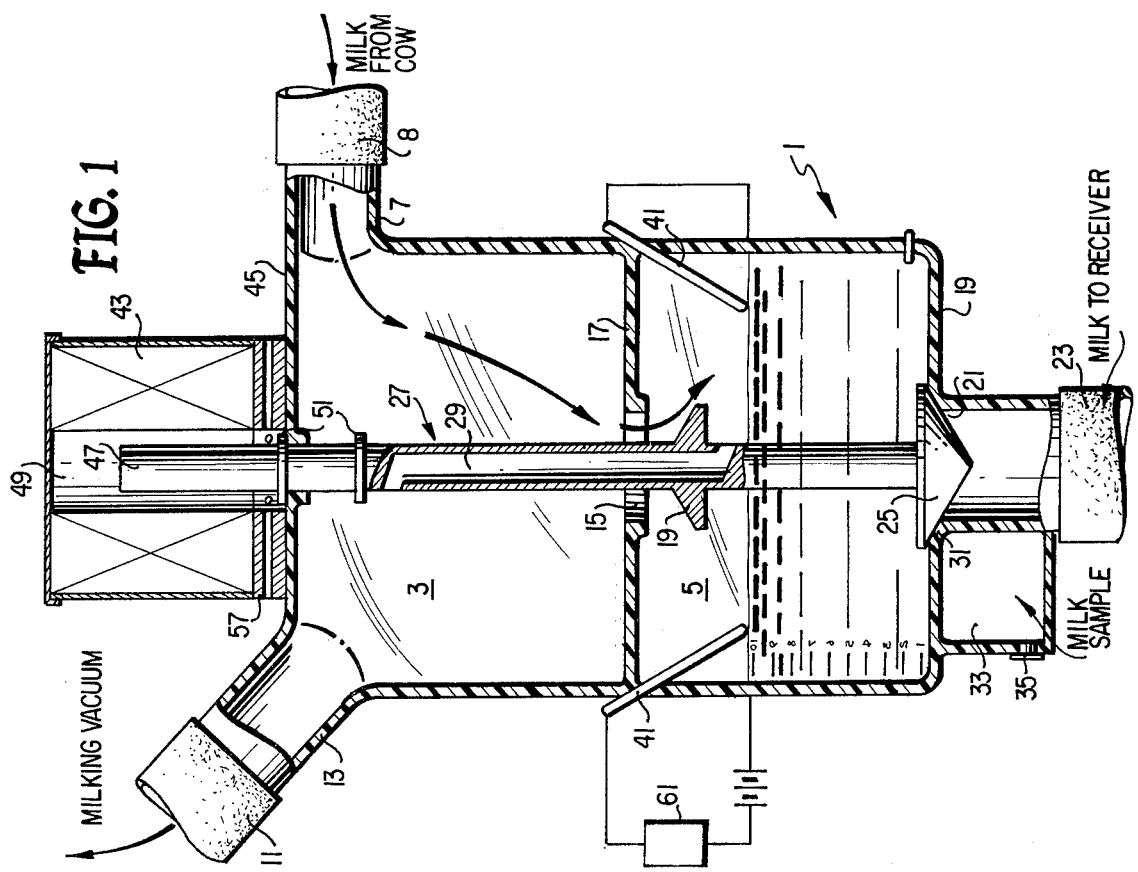
FIG. 1 is an elevation in section of a valved milk receiver having dual chambers.

In FIG. 1, a milker unit includes a container 1 having an upper chamber 3 and a lower chamber 5 positioned directly below chamber 3. At the top of the chamber 3 are one or more milk inlet nipples 7 with each nipple being connectable to its corresponding milk conduit line 8 and teat cup (not shown) so that milk from the teat cups flows through conduit lines 8 and nipples 7 directly into the top of chamber 3. The chamber 3 can be placed under a vacuum of about 10 inches Hg by a source of vacuum such as a pump (not shown) via vacuum line 11 on connector 13. An opening 15 in the bottom 17 of chamber 3 leads from the chamber 3 to chamber 5 so that milk received from conduit 8 normally passes by gravity through the opening 15 from chamber 3 into chamber 5.

A first valve 19 seats on the opening 15 and is movable vertically within lower chamber 5 to open or close opening 15. At the bottom 18 of chamber 5, an outlet 21 is connected to a milk collector line 23 which can communicate with a bulk milk tank (not shown) under vacuum. The line 23 can be under a relative high vacuum, in the order of about 17 inches Hg or at least connected to a separate vacuum source from that connected to line 11. The outlet 21 is valved open and shut by a second valve 25 which seats in the bottom 19 of chamber 5. Valve 25 also moves vertically within lower chamber 5 to open and close outlet 21.

Figure 2:
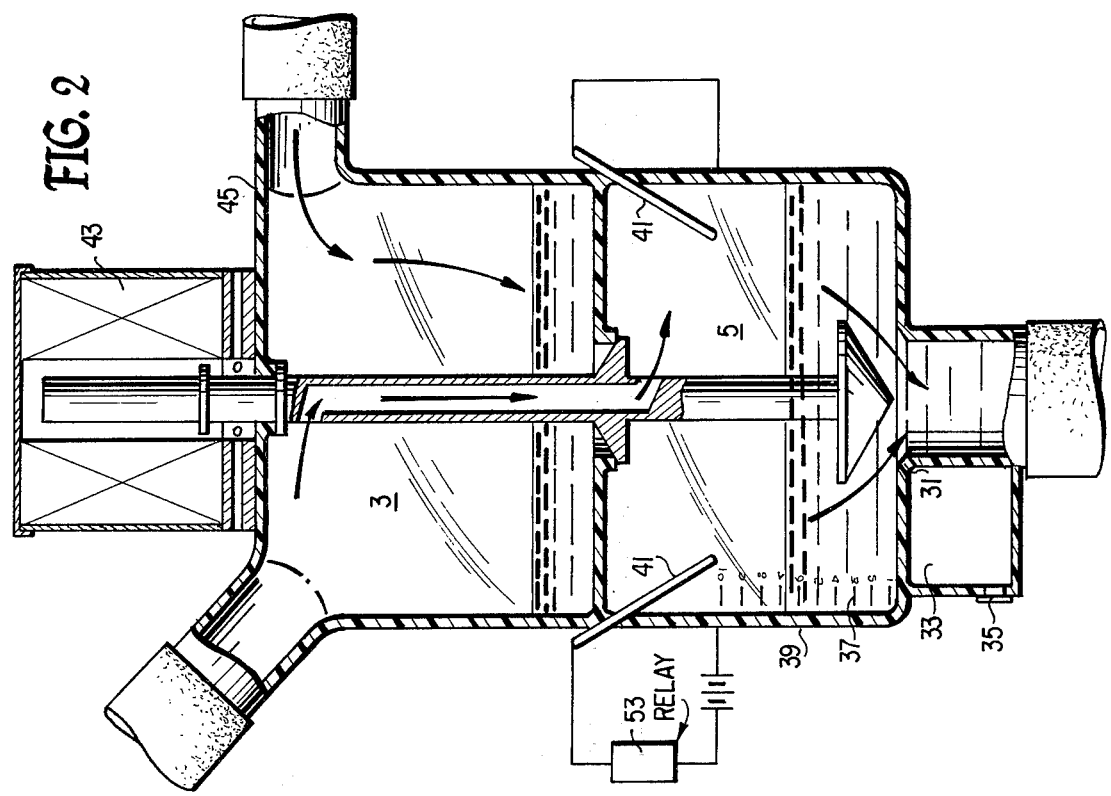
FIG. 2 is similar to FIG. 1, showing the valves of the FIG. 1 receiver being cycled for draining.

The valves 19 and 25 are each mounted on a common elongated stem member 27 provided with an interconnecting duct 29 that communicates with each chamber to equalize the pressure in chamber 3 and the top of chamber 5. It will be appreciated that the relatively higher vacuum in collector line 23 is preserved during the time that valve 25 is seated as shown in FIG. 2 and for most of the time when valve 25 is unseated, during the time that milk is draining through outlet 21. The stem 27 with valves 19 and 25 are normally moved downwardly by gravity so that the former valve is unseated while the latter valve is seated and vice versa.

A capillary 31 is normally shut by valve 25 when the latter is seated, but is open to admit milk to a sample container 33 attached to the bottom 19 of container 1. A drain plug 35 is provided in the container 33 to draw milk samples from container 33 for testing. A scale with marking indicia 37 is imprinted on the outer wall 39 of container 1 which can be formed of transparent material so that a reading of the liquid level in chamber 5 is readily obtained.

A pair of sensing electrodes 41 extend within chamber 5 at the upper end of that chamber. The electrodes 41 can be frictionally or otherwise held in a preselected position and are individually adjustable in a vertical direction so that when the predetermined level of milk touches each electrode, a circuit is established to activate a solenoid 43 positioned at the top 45 of container 1.

Stem member 27 extends up through passageway 49 and the upper portion 47 of stem 27 is capable of being magnetized so that when solenoid 43 is activated, stem 27 is moved upwardly. A vented spacer ring 57 separates solenoid 43 from the top 45 of container 1. It will be appreciated that the solenoid need only be of sufficient strength to move valves 19 and 25 with respect to their seats. Thus, the stem 27 can terminate and most of the portion 47 eliminated with a more compact solenoid.

The upper portion on stem 27 has spaced apart stops 51 that limit the vertical movements of the stem 27 as well as valves 19 and 25. As seen in FIG. 1, the milk being collected in chamber 5 is about to bridge the circuit between electrodes 41.

In FIG. 2, a delay relay 53 is arranged to maintain the current to solenoid 43 for a predetermined length of time after being activated while valve 25 remains unseated until complete drainage of chamber 5 takes place. Valve 19 is seated simultaneously with the complete unseating of valve 25 so that milk collects in upper chamber 3 until chamber 5 is drained and stem 27 released to the FIG. 1 position. With this arrangement, a measured and predetermined amount of milk is emptied from container 1 each time the solenoid 43 is signalled.

A counter 61 is triggered by the flow of current through the milk in chamber 5 between electrodes 41 to record each time chamber 5 is emptied. It will be appreciated that milking can continue during both the emptying and refilling of the lower chamber 5 while the volume and/or weight of the milk discharged from chamber 5 can be accurately recorded. Thus, each cow being milked can be monitored closely until that cow has been completely milked. After an animal has been completely milked, that fraction of milk remaining in chamber 5 under electrodes 41 can be measured by reading of indicia 37 to the end that an accurate record of each animal is maintained.

The milker unit of FIG. 1 is particularly designed for a dual vacuum system wherein the upper chamber and the teat cups are subjected to stable vacuum which makes possible a relatively low vacuum in the order of about 10 in. Hg and the vacuum in collector line 23 is significantly higher, say 17 in. Hg. This greatly reduces the possibility of injury to the cow as well as assures a reduced need for a high degree of differential vacuum to convey the milk.

In FIGS. 3 and 4 a milker unit is described that can be used with conventional vacuum system wherein a single vacuum of about 10–17 in. Hg is maintained both in the claw and in the collector system. The container 101 is essentially the same as container 1 so that the numbers of identical parts has been largely omitted. The stem 127 has a duct 129 that has an upper opening 150 located between stops 51 and a lower exit 160 which is located immediately below valve 19.

The vacuum maintained in vacuum line 11 and within upper chamber 3 is about 10–17 in. Hg which is about the same as that in collector line 23 as well as lower chamber 5. When electrodes 41 are bridged by milk, again the solenoid 43 lifts stem 129 together with valves 19 and 25 to permit the complete drainage of chamber 5 as shown in FIG. 4. When stem member 127 is lifted, opening 150 is moved from a position in which it is blocked by the top 45 received 101 to an upper position located within vented spacer ring 57. Ambient pressure is then established between the atmosphere and the interior of chamber 5 so that complete and rapid drainage takes place.

The FIGS. 1 and 2 receiver is particularly designed to function in a dual vacuum system such as that disclosed in U.S. Pat. No. 3,373,720. However, both containers disclosed in FIG. 1 or FIG. 3 are doubled chambered to measure and signal an individual cow's milk production. The increment of milk collected in the receivers' lower chambers can be transmitted to a readout on an electric panel.

The probes 41 can be individually moved vertically to change the milk increment volume to trigger the valve cycling or to compensate for the tilt of the unit when supported on an unlevel position. The volume of the lower chamber is sufficiently large to provide accuracy in accordance with DHIA specifications.

Each of the units described above ensure that any air leakage that occurs in the teat cups or air injected by the pulsation system can be eliminated quickly. Further, washing and/or rinsing solutions can be cycled through the units while the units are in place.

What is claimed is:

1. A milker unit comprising a double chambered container, including an upper chamber positioned over a lower chamber, said upper chamber being connected to milk conduit means which conveys milk to said upper chamber, said lower chamber having a valved outlet at the lower portion thereof connected to a milk collector line, a source of vacuum being in communication with the interior of said upper chamber through a vacuum line, and an opening in the bottom of the upper chamber leading to the interior of said lower chamber, a first valve being seatable on said opening and connected to a second valve that is normally seated on said outlet in the lower chamber, said valves being interconnected by common stem means, whereby the seating of said first valve unseats said second valve and vice versa, said stem means extending upwardly through both chambers to a solenoid, electrical means in said lower chamber for sensing the level of milk in that chamber and signalling said solenoid means to raise said stem means and simultaneously move said valves responsive to a predetermined level of milk, whereby said second valve is unseated and milk drains from the container through said outlet while said first valve seats and milk collects in the upper chamber.

2. The unit of claim 1, wherein said stem means has a duct that bridges and chambers and communicates the ambient pressure of said upper chamber to the lower chamber when said first valve is seated.

3. The unit of claim 2, wherein the vacuum in said collector line is at a higher value than the vacuum in said vacuum conduit and the upper chamber.

4. The unit of claim 1, when said stem means is an elongated stem that has a limit stop or either side of the top of said receiver, said solenoid being supported on said receiver to receive said stem.

5. The unit of claim 4, wherein said stem has a duct extending from an opening below said first to a second opening between said two stops, whereby atmospheric pressure is vented to said lower chamber when said first valve is seated.

6. The unit of claim 1, wherein the degree of vacuum in the collector line and in the vacuum conduit is substantially the same.

7. The unit of claim 1, wherein said electrical means includes spaced apart electrical probes that are bridged by milk in said lower chamber to complete a circuit when the milk reaches a predetermined level to operate said solenoid and unseat said first valve allowing milk to exit through the collector line.

8. The unit of claim 7, wherein said electrodes are connected to a counter that records each signal to said solenoid.

* * * * *